United States Patent
Erben et al.

(10) Patent No.: US 6,547,185 B2
(45) Date of Patent: Apr. 15, 2003

(54) CONTROL FOR A PASSENGER DOOR OF AN AIRCRAFT

(75) Inventors: Hannes Erben, Hamburg (DE); Pascal Laurent, Aix en Provence (FR)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/919,311

(22) Filed: Jul. 31, 2001

(65) Prior Publication Data

US 2002/0014557 A1 Feb. 7, 2002

(30) Foreign Application Priority Data

Aug. 2, 2000 (DE) .......................................... 100 37 621

(51) Int. Cl.[7] ................................................. B64C 1/14
(52) U.S. Cl. ................................. 244/129.5; 244/129.4; 49/31
(58) Field of Search ........................... 244/129.5, 129.4; 49/31

(56) References Cited

U.S. PATENT DOCUMENTS

| | | | |
|---|---|---|---|
| 3,051,280 A | | 8/1962 | Bergman et al. |
| 3,085,297 A | | 4/1963 | Linderfelt |
| 3,791,073 A | * | 2/1974 | Baker ...................... 244/129.5 |
| 4,180,287 A | | 12/1979 | Youngblood et al. |
| 4,180,943 A | | 1/1980 | Smith et al. |
| 4,473,201 A | | 9/1984 | Barnes et al. |
| 4,482,113 A | | 11/1984 | Backlund et al. |
| 4,497,462 A | * | 2/1985 | Hamatani ................ 244/129.5 |
| 4,560,123 A | | 12/1985 | Sealey et al. |
| 4,680,891 A | * | 7/1987 | Perkins .................... 244/129.5 |
| 4,720,065 A | | 1/1988 | Hamatani |
| 4,915,326 A | * | 4/1990 | Plude ...................... 244/129.5 |
| 5,163,639 A | | 11/1992 | Herrmann et al. |
| 5,251,851 A | * | 10/1993 | Herrmann et al. ...... 244/129.5 |
| 5,305,969 A | | 4/1994 | Odell et al. |
| 5,337,977 A | | 8/1994 | Fleming et al. |
| 5,613,716 A | | 3/1997 | Cafferty |

(List continued on next page.)

FOREIGN PATENT DOCUMENTS

| | | | |
|---|---|---|---|
| DE | 19702084 | 2/1998 | |
| EP | 317037 A2 | * 5/1989 | ............. B64C/1/14 |
| EP | 0321994 | 6/1989 | |
| EP | 0465785 | 1/1992 | |
| EP | 0512588 | 11/1992 | |
| EP | 0597418 | 5/1994 | |
| GB | 2189539 | 10/1987 | |
| GB | 2332705 | 6/1999 | |

OTHER PUBLICATIONS

U.S. patent application 09/845,530, filed on Apr. 30, 2001, Hannes Erben et al.; entitled: Method and Device for Closing the Door of an Aircraft; pp. 1 to 22 and 4 sheets of drawings.

(List continued on next page.)

Primary Examiner—Peter M. Poon
Assistant Examiner—Gabriel S Sukman
(74) Attorney, Agent, or Firm—W. F. Fasse; W. G. Fasse

(57) ABSTRACT

In a door closing procedure, an aircraft passenger door is pivoted from an open position to a pivoted-in position, shifted to a closed position, locked into a locked condition, and then secured into a secured locked condition. A control method and arrangement for controlling the closing procedure includes sensors that respectively each sense the completion of a respective allocated one of the steps of the closing procedure, and then responsively initiate the next following step of the procedure. The closing procedure is carried out in an automatic sequential step-wise manner using a simple robust arrangement, without requiring a computer control.

21 Claims, 1 Drawing Sheet

U.S. PATENT DOCUMENTS

| | | | |
|---|---|---|---|
| 5,667,169 A | | 9/1997 | Erben et al. |
| 5,735,487 A | * | 4/1998 | Abild et al. ............. 244/129.5 |
| 5,823,473 A | | 10/1998 | Odell et al. |
| 5,848,575 A | | 12/1998 | Freeman et al. |
| 6,109,563 A | * | 8/2000 | Verhoeven et al. ...... 244/129.5 |
| 6,116,542 A | | 9/2000 | Erben |
| 6,158,692 A | * | 12/2000 | Abild et al. ............. 244/129.5 |
| 6,168,114 B1 | | 1/2001 | Erben |

OTHER PUBLICATIONS

U.S. patent application 09/991,099, filed on Nov. 16, 2001, Wolfgang Buchs et al.; entitled: Method and Arrangement for Controlling the Closing and Opening Operation of a Passenger Door of an Aircraft; pp. 1 to 33 and 2 sheets of drawings.

* cited by examiner

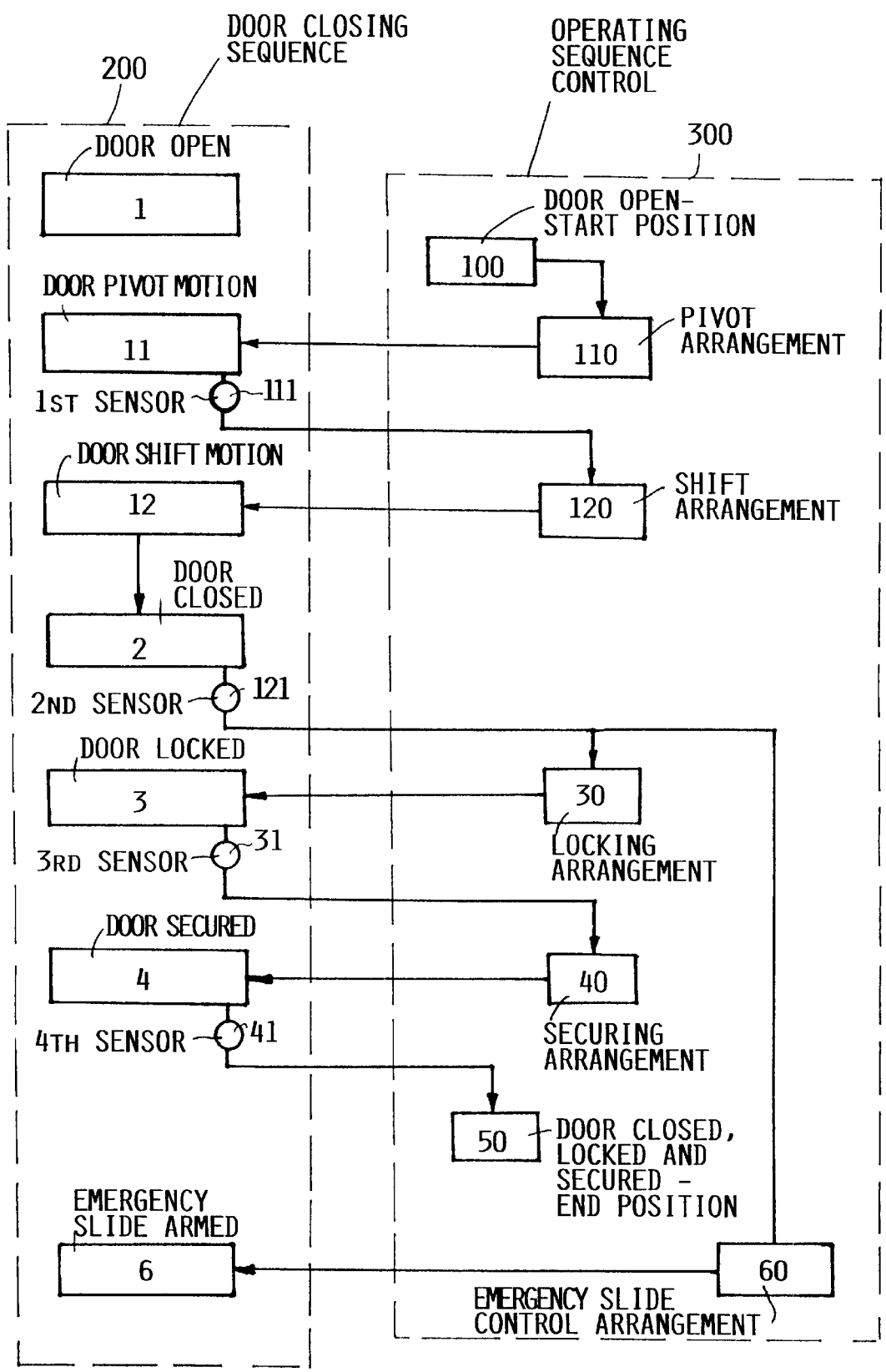

CONTROL FOR A PASSENGER DOOR OF AN AIRCRAFT

PRIORITY CLAIM

This application is based on and claims the priority under 35 U.S.C. §119 of German Patent Application 100 37 621.5, filed on Aug. 2, 2000, the entire disclosure of which is incorporated herein by reference.

FIELD OF THE INVENTION

The invention relates to a control arrangement for a passenger door of an aircraft, whereby the passenger door is movably connected to the fuselage by a support arm, a pivot and stroke (or shift) arrangement guides the passenger door between open and closed conditions, a locking arrangement achieves a locked condition, and a control for door functions has sensors and actuators arranged in connection therewith.

BACKGROUND INFORMATION

According to German patent DE 197 02 084, a passenger door of an aircraft is closed by a closing process that includes a pivoting-in motion and then a stroke motion. Namely, the door is guided along a stroke or sliding shift motion path that is curved essentially conforming to the aircraft outer contour, during the closing process at the end of the pivoting-in motion. The stroke motion path is guided essentially perpendicularly to the pivoting direction of the passenger door.

At the end of the path of a pivoting-in motion and with the beginning of the stroke motion path, the passenger door is lowered by means of a stroke or shift arrangement and guided into a closed condition. The closed condition corresponds to a form-locking engagement of stop elements fixed to the door with contact elements fixed to the door frame. In the closed condition, the passenger door is further locked by means of a locking arrangement, whereby the door is held in a locked condition. In this context, the locking arrangement works independently of the stroke and pivot arrangement. The locking arrangement of the passenger door, in the structurally simplest case, comprises a stop element that is movable by a drive shaft into a locking or arresting position. In this context the locking is, for example, activated or deactivated by a rotatable drive shaft.

Published European Patent Application EP 0,465,785 A1 discloses the conceptual suggestion, to provide electric motorized individual drives for operating means of a passenger door. The electric motorized motion is achieved by known measures of computer controlled automation. The installation of program controlled electric motors is known. A person skilled in the art knows that this requires a host or master computer executing or carrying out corresponding computer programs. Such a solution is complicated, costly and not absolutely necessary.

SUMMARY OF THE INVENTION

In view of the above, it is an object of the invention to provide a simple and extremely economical control for a passenger door of an aircraft with a pivot and stroke arrangement, which nonetheless meets all safety requirements. It is another object of the invention to provide a positive enforced sequential execution of a door closing or opening process without requiring computer control means. The invention further aims to avoid or overcome the disadvantages of the prior art, and to achieve additional advantages, as apparent from the present specification.

The above objects have been achieved according to the invention in a control arrangement and method for controlling a door (e.g. a passenger door) of an aircraft. The invention is especially provided in or for an aircraft including a fuselage with a door opening therein, a door, a support arm that movably connects the door to the fuselage and enables the door to move between an open position in which the door opening is open and a closed position in which the door closes the door opening, a pivot and stroke arrangement that is connected to the door and adapted to move the door between the open position and the closed position, a locking arrangement adapted to lock the door from the closed position to a locked condition, and a control connected to the pivot and stroke arrangement and to the locking arrangement and adapted to control the movement of the door between the open position and the closed position, and the locking of the door into the locked condition. The invention especially is directed to an improvement in the control, wherein the control is an operating sequence control, that is adapted to carry out a sequence of successive door closing steps, and that comprises a plurality of door condition sensors that respectively sense a respective door condition of the door and that switch the sequence from one to a next successive one of the door closing steps responsive to sensing the respective condition.

The passenger door control according to the invention is an operating sequence control, which controls the door functions or door closing steps of the passenger door. In this operating sequence control, a respective sensor is respectively allocated to each respective door function or step, and each sensor respectively controls the switching of the control sequence further to the next door function. In this manner, function sequences are carried out in a positive or enforced step-wise manner. Each respective sensor recognizes the beginning and/or the end of a respective allocated door function and initiates or activates the sensor and/or the actuator for the next door function. Respectively only the sensor of the running door function is active. According to particular embodiments, the sensor can trigger the further switching or stepping to the next function or step of the door closing process dependent on a path distance already traversed, or certain determined angular positions of the passenger door or of a component of the stroke and pivot arrangement.

The operating sequence control essentially requires sensors that monitor and initiate or activate the further switching to the next door function. Thereby, the invention entails an extremely small effort and expense with respect to the apparatus, and the control remains very robust and with little sensitivity to interference. Overall, this solution is extremely economical in comparison to a computer controlled solution.

The above objects have further been achieved according to the invention in a method of closing an aircraft door relative to a door opening of an aircraft fuselage. The inventive method includes the following steps:

a) pivoting the door from an open position to a pivoted-in position relative to the door opening;
b) sensing when the door achieves the pivoted-in position;
c) responsive to the sensing of the step b), shifting the door from the pivoted-in position to a closed position relative to the door opening;
d) sensing when the door achieves the closed position; and
e) responsive to the sensing of the step d), locking the door into a locked condition.

In this method, the functions or steps of the door closing process are carried out in a fixed, positively enforced sequence, which can be executed automatically without any computer control. The process for opening the door is essentially the reverse of the process for closing the door, and the same sensors and the like will be effective for triggering the switching from one step to the next in the door opening process as well.

BRIEF DESCRIPTION OF THE DRAWINGS

In order that the invention may be clearly understood, it will now be described in connection with an example embodiment, with reference to the accompanying drawing, wherein the single drawing FIGURE shows the operating sequence control in connection with a schematic flow diagram of the door functions.

DETAILED DESCRIPTION OF PREFERRED EXAMPLE EMBODIMENTS AND OF THE BEST MODE OF THE INVENTION

A representative example passenger door is constructed, for example, as described in German patent DE 197 02 084 C1, the disclosure of which is incorporated herein by reference as background information. The present single drawing FIGURE shows a sequence 200 of steps (or door functions) as they arise for a closing process of a passenger door of an aircraft. This sequence of steps in a reversed order is characteristic for an opening process of the door.

The closing process is triggered by pivoting the door, for example by hand, out of the open starting position 100 of the open condition 1. In the closing process, the door is guided out of an open condition 1 until it reaches a pivoted-in position at the end of a pivoting motion 11 by means of pivoting arrangement 110, which may simply comprise a mechanical pivot hinge that allows the door to be manually pivoted. Alternatively, this pivoting step may be a powered or automated step triggered by pressing a button or otherwise actuating a switch, so that an electric motor pivots the passenger door. A sensor 111 feels or senses the end of the pivoting-in motion. The sensor 111 is, for example, arranged at the end of the pivoting-in path.

When the sensor 111 is contacted by the passenger door, the sensor 111 generates or releases a signal which starts the stroke or shift arrangement 120, which responsively carries out a stroke or shift motion 12 (corresponds to a sinking or lowering) of the door along a stroke motion path, which is guided essentially perpendicularly to the pivoting direction. Thereby, the passenger door is lowered into a closed condition 2. The end of the stroke motion 12 corresponds to the closed condition 2 that has been reached. A sensor 121 feels or senses that the door has reached the end of the stroke motion 12 and therewith simultaneously senses that the closed condition 2 has been reached or achieved. The sensor 121 can be a mechanically operating sensor, for example a movable pin, which is pressed against an electric contact upon reaching the closed condition 2, so that a current loop or circuit is opened or closed, in order to thereby emit a start signal for the locking arrangement 30.

Generally, pivot arrangement 110 and stroke arrangement 120 form a common arrangement, which is, however, not a requirement. The pivot and stroke arrangement 110, 120 has mechanically or electromechanically operating component groups or assemblies, whereby the door carried by a support arm is guided and/or actively moved into the closed condition 2.

In the closed condition 2, the door closes or covers and seals the door opening. Once the sensor 121 senses that the closed condition has been achieved, it automatically triggers or begins a locking of the door by means of the locking arrangement 30, i.e. the sensor 121 provides a corresponding activation signal to the locking arrangement 30, which serves to lock the passenger door in its closed condition 2 relative to the fuselage. For this purpose, door-mounted locking means such as hooks, for example, reach behind frame-mounted stop means and lock or arrest the passenger door.

The locked condition 3 of the door is sensed by a sensor 31. It forms (i.e. generates or releases) a signal which starts the securing arrangement 40. For example, this may be achieved in that an arresting member or detent is released out of the drive shaft for the securing arrangement 40, so that the drive shaft can carry out a further rotation and therewith positioning of securing means, such as stop elements, detents, pawls, hooks, latches, bolts, pins etc. The securing means of the securing arrangement secure the locked condition 4. Thereby an unintentional opening of the passenger door in the event of a failure of the locking arrangement 30 is avoided. The securing arrangement 40 can be combined with the locking arrangement 30 to form one arrangement. This may similarly be embodied to operate mechanically or electromechanically. There is no requirement to embody and arrange the mechanisms of the individual arrangements strictly separately from each other. The locking arrangement and the securing arrangement may be embodied in any conventionally known manner.

A control for closing or opening the passenger door must carry out or execute the above described functions in a fixedly prescribed sequence 200 of door functions (process steps). The beginning or end condition of a respective door function or process step must be reliably recognized and signaled by a respective sensor 111, 121, 31, 41. In this context, sensors that sense the respective ends of door functions dependent on path distances already traversed or certain determined positions may be utilized. Thereby, the sensors provide a signal, which respectively activates and/or deactivates the respective arrangements 110, 120, 30, 40 for carrying out the respective next door function.

In the simplest case, this can be achieved mechanically, for example by a pin carried along by the passenger door. When the door reaches the end of a respective process step, the pin strikes against and moves a movable stop, which, as a result of its position change, releases a force transmission of an actuator that carries out the next following door function.

The further switching from one door function to the next door function may alternatively or additionally be carried out electrically and/or electronically. Namely, the switching may be carried out if a defined time-based or process-based further switching condition is fulfilled. one of such further switching conditions corresponds to a signal signaled by the sensor 111, 121, 31, 41.

For the above described purposes of the invention, it is not necessary to provide a computer with computer programs, or to build a computer hierarchy. In this manner, the control can be embodied in a simple, robust, and less interference sensitive manner. The control for the arrangements or devices of the passenger door relates to an operating sequence control 300. The operating sequence control 300 represents an operating sequence chain of control steps. The arrangements 110, 120, 30 and 40 may, for example, possess electric motor drives as actuating means, which cooperate through further mechanical force transmission means, to initiate and drive the motion or to guide mechanical elements of the door arrangement into a locked condition 3 or a secured locked condition 4. If electric motor actuators are not to be utilized, then in a mechanical solution, the locked condition 3 and the secured locked condition 4 are possible by mechanical operation of a hand lever to transition the door out of a start position 100 into an end position 50.

A further additional step in the closing process is the activation or arming of the emergency escape slide 6 by operation of an emergency escape slide arrangement 60. This is a door function that is independent of the locked condition 4, and is started with recognition of the closed condition 2 by means of sensor 121. The emergency escape slide arrangement 60, which is activated by the sensor 121, brings the emergency escape slide 6 into an active or armed state.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In an aircraft including a fuselage with a door opening therein, a door, a support arm that movably connects said door to said fuselage and enables said door to move between an open position in which said door opening is open and a closed position in which said door closes said door opening, a pivot and stroke arrangement that is connected to said door and adapted to move said door between said open position and said closed position, a locking arrangement adapted to lock said door from said closed position to a locked condition, and a control connected to said stroke and pivot arrangement and to said locking arrangement and adapted to control the movement of said door between said open position and said closed position, and the locking of said door into said locked condition;

an improvement in said control, wherein said control is an operating sequence control, that is adapted to carry out a positively enforced sequence of successive door closing steps in a chain of individual control steps, and that comprises door condition sensors, which are respectively allocated to said individual control steps, and which respectively sense a respective associated door condition of said door corresponding to one of said open position, said closed position, and said locked condition, and which switch said sequence from one of said door closing steps to a next successive one of said door closing steps responsive to sensing said respective condition, and wherein only a respective active one of said sensors allocated to a presently active one of said control steps is active at any one time, and wherein said respective active sensor initiates and enables a next successive one of said sensors allocated to a next successive one of said control steps to become active upon completion of said presently active one of said control steps.

2. The improvement in the control according to claim 1, wherein a respective one of said sensors is a path distance sensor, and wherein said door condition is indicated by a path distance traversed by said door or a component of said pivot and stroke arrangement.

3. The improvement in the control according to claim 1, wherein a respective one of said sensors is an angular position sensor, and wherein said door condition is indicated by an angular position of said door or a component of said pivot and stroke arrangement.

4. A door arrangement for an aircraft, comprising:
a door frame bounding a door opening in a fuselage of an aircraft:
a door;
at least one support arm that movably connects and supports said door relative to said door frame;
a pivot arrangement that is connected to said door and enables said door to pivot from an open position to a pivoted-in position relative to said door opening;
a shift arrangement that is connected to said door and enables said door to shift from said pivoted-in position to a closed position in which said door closes said door opening;
a locking mechanism arranged and adapted to lock said door into a locked condition relative to said door frame while said door is in said closed position; and
an operating sequence control including a first sensor arranged and adapted to sense said pivoted-in position of said door, and a second sensor arranged and adapted to sense said closed position of said door;
wherein said first sensor activates said shift arrangement to shift said door from said pivoted-in position to said closed position, responsive to sensing said pivoted-in position of said door;
wherein said second sensor activates said locking mechanism to lock said door into said locked condition, responsive to sensing said closed position of said door; and
wherein only one of said sensors is active at any one time, and said first sensor initiates and enables said second sensor to become active responsive to said first sensor sensing said pivoted-in position of said door, so that said door can only be operated in a positive enforced sequence of operations.

5. The door arrangement according to claim 4, wherein said second sensor deactivates said shift arrangement responsive to sensing said closed position of said door.

6. The door arrangement according to claim 4, further comprising an emergency evacuation slide and a slide control arrangement, wherein said second sensor activates said slide control arrangement to arm said slide responsive to sensing said closed position of said door.

7. The door arrangement according to claim 4, wherein each one of said sensors is respectively selected from the group consisting of contact sensors, position sensors, distance sensors, and angular position sensors.

8. The door arrangement according to claim 4, wherein said operating sequence control does not include a computer processor.

9. The door arrangement according to claim 4, wherein said pivot arrangement comprises a passive pivot hinge allowing said door to be manually pivoted from said open position to said pivoted-in position, said shift arrangement includes a first power actuator that automatically shifts said door from said pivoted-in position to said closed position upon being activated by said first sensor, and said locking mechanism includes a second power actuator that automatically locks said door into said locked condition upon being activated by said second sensor.

10. The door arrangement according to claim 4, wherein said pivot arrangement comprises a trigger button and a first power actuator that automatically pivots said door from said open position to said pivoted-in position upon manual actuation of said trigger button, said shift arrangement includes a second power actuator that automatically shifts said door from said pivoted-in position to said closed position upon being activated by said first sensor, and said locking mechanism includes a third power actuator that automatically locks said door into said locked condition upon being activated by said second sensor.

11. A method of closing an aircraft door relative to a door opening of an aircraft fuselage controlled by a first sensor and a second sensor, comprising the following steps:
   a) pivoting said door from an open position to a pivoted-in position relative to said door opening, and initiating and enabling said first sensor to become active;
   b) sensing with said first sensor when said door achieves said pivoted-in position;
   c) responsive to and activated by said sensing of said step b), shifting said door from said pivoted-in position to a closed position relative to said door opening, and initiating and enabling said second sensor to become active;
   d) sensing with said second sensor when said door achieves said closed position; and
   e) responsive to and activated by said sensing of said step d), locking said door into a locked condition;
wherein only one of said sensors is active at any one time, so that said steps a) to e) can only be carried out successively in a positive enforced sequence of said steps.

12. The method according to claim 11, further comprising a step of arming an emergency evacuation slide responsive to said sensing of said step d).

13. The method according to claim 11, carried out entirely without using a computer processor and without executing a computer program.

14. The method according to claim 11, wherein said steps b), c), d) and e) are carried out automatically in a positive succession beginning when said door achieves said pivoted-in position.

15. The method according to claim 14, wherein said step a) is carried out manually.

16. The method according to claim 14, wherein said step a) is carried out automatically in a powered manner which is initiated by manually actuating a start switch.

17. A door arrangement for an aircraft, comprising:
   a door frame bounding a door opening in a fuselage of an aircraft:
   a door;
   at least one support arm that movably connects and supports said door relative to said door frame;
   a pivot arrangement that is connected to said door and enables said door to pivot from an open position to a pivoted-in position relative to said door opening;
   a shift arrangement that is connected to said door and enables said door to shift from said pivoted-in position to a closed position in which said door closes said door opening;
   a locking mechanism arranged and adapted to lock said door into a locked condition relative to said door frame while said door is in said closed position;
   a securing mechanism arranged and adapted to secure said door into a secured condition when said door is in said locked condition; and
   an operating sequence control including a first sensor arranged and adapted to sense said pivoted-in position of said door, a second sensor arranged and adapted to sense said closed position of said door, and a third sensor arranged and adapted to sense said locked condition of said door;
   wherein said first sensor activates said shift arrangement to shift said door from said pivoted-in position to said closed position, responsive to sensing said pivoted-in position of said door;
   wherein said second sensor activates said locking mechanism to lock said door into said locked condition, responsive to sensing said closed position of said door; and
   wherein said third sensor activates said securing mechanism to secure said door into said secured condition responsive to sensing said locked condition of said door.

18. The door arrangement according to claim 17, wherein said operating sequence control further includes a fourth sensor arranged and adapted to sense said secured condition of said door, and wherein said fourth sensor deactivates said securing mechanism responsive to sensing said secured condition of said door.

19. The door arrangement according to claim 17, wherein said second sensor deactivates said shift arrangement responsive to sensing said closed position of said door, and said third sensor deactivates said locking arrangement responsive to sensing said locked condition of said door.

20. A method of closing an aircraft door relative to a door opening of an aircraft fuselage, comprising the following steps:
   a) pivoting said door from an open position to a pivoted-in position relative to said door opening;
   b) sensing with a first sensor when said door achieves said pivoted-in position;
   c) responsive to said sensing of said step b), shifting said door from said pivoted-in position to a closed position relative to said door opening;
   d) sensing with a second sensor when said door achieves said closed position;
   e) responsive to said sensing of said step d), locking said door into a locked condition;
   f) sensing with a third sensor when said door achieves said locked condition; and
   g) responsive to said sensing of said step f), securing said door into a secured condition that securely maintains said locked condition.

21. The method according to claim 20, wherein said steps b), c), d), e), f) and g) are carried out automatically in a positive succession beginning when said door achieves said pivoted-in position.

* * * * *